Oct. 22, 1963   R. F. SCHULTZ ETAL   3,107,503
AUTOMOBILE REFRIGERATING APPARATUS
Filed April 16, 1962   2 Sheets-Sheet 1

INVENTORS
Raymond F. Schultz
Edward J. O'Toole
BY Richard E. Widdowson

Their Attorney

Oct. 22, 1963   R. F. SCHULTZ ETAL   3,107,503
AUTOMOBILE REFRIGERATING APPARATUS
Filed April 16, 1962   2 Sheets-Sheet 2

INVENTORS
Raymond F. Schultz
Edward J. O'Toole
Richard E. Widdowson
BY Carl A. Stickel
Their Attorney

United States Patent Office 3,107,503
Patented Oct. 22, 1963

3,107,503
AUTOMOBILE REFRIGERATING APPARATUS
Raymond F. Schultz, Edward J. O'Toole, and Richard E. Widdowson, Dayton, Ohio, assignors to General Motors Corporation, Detroit, Mich., a corporation of Delaware
Filed Apr. 16, 1962, Ser. No. 187,533
4 Claims. (Cl. 62—217)

This invention pertains to refrigerating apparatus and more particularly to automotive air conditioning apparatus wherein it is desired to keep the evaporator at a constant low temperature and pressure at all times but just high enough to prevent frosting of the evaporator.

In automobile air conditioning systems, it is urgent to keep the evaporator at a minimum size in order to conserve space. To obtain maximum cooling effect from such a small evaporator, it is necessary to operate the evaporator as cold as possible but also to prevent the accumulation of frost thereon. This has been accomplished in systems operating under more constant conditions. It, however, has not been successfully accomplished in automobile air conditioning systems which may operate at varying speeds under all types of weather and altitude conditions. For example, the automobile may drive through the hot, low altitude, low humidity regions like Death Valley, California, or up to the top of Pike's Peak in Colorado, or from the warm humid climate of Florida to the cold of Alaska and Canada. Since the compressor is driven by the car engine at speeds varying with the car speed, this provides further difficulties in maintaining a constant evaporator temperature.

It is an object of this invention to provide a control which will maintain the temperature and pressure within the evaporator substantially constant over a wide range of engine speeds and a wide range of rates of evaporation and heat load as well as ambient temperature and atmospheric pressure.

It is another object of this invention to provide a suction line control for an evaporator which will maintain the pressure within the evaporator substantially constant from the smallest to the largest rate of evaporation obtainable and which will be substantially unaffected by variations in ambient temperature or atmospheric pressure.

It is another object of this invention to provide a suction line control for an evaporator which will maintain the pressure within the evaporator substantially constant from the smallest to the largest rate of evaporation obtainable which will have a low-rate operating diaphragm exposed on one side to the pressure of the refrigerant in the evaporator and exposed on the opposite side to a substantially constant vacuum maintained under various conditions of engine speed and passenger load as well as the varying temperatures inside and outside of the automobile and also varying atmospheric pressures.

These and other objects are obtained in the form shown in the drawings in which a suction line evaporator pressure regulating valve is provided between the outlet of the evaporator and the inlet of the compressor. This suction line valve includes a low-rate rolling fold type of elastomeric diaphragm responsive to the pressure of the evaporator. A large piston-type valve is provided on one side of and moves with the deflection of the diaphragm. A low-rate spring and a sealed casing is provided on the opposite side of the diaphragm. To prevent the pressure upon the opposite side of the diaphragm from affecting the operation of the valve, there is maintained in the sealed casing upon the opposite side of the diaphragm a substantially constant vacuum or substantially constant low absolute pressure. The valve remains closed until the pressure within the evaporator reaches the value for which the valve is set. The valve is of a low-rate type so that it will move from fully closed position to fully open position upon a relatively small increase in pressure. This tends to maintain the evaporator at a substantially constant pressure and temperature.

The low-rate rolling fold type diaphragm may be subject to slight leakage. Therefore, to the interior of the sealed casing adjacent the diaphragm, there is connected a conduit provided with a vacuum control valve adapted to maintain a constant vacuum in the sealed casing adjoining the pressure responsive diaphragm of the valve. According to our invention, we connect a vacuum conduit to the interior of the sealed casing of the valve. This conduit connects through a vacuum regulating valve to the intake manifold of the gasoline engine, also used to operate the vehicle or car. This vacuum regulating valve is compensated for changes in atmospheric or barometric pressure through the use of an evacuated bellows. Since the bellows is evacuated, it will not be substantially affected by the changes in temperature. By this arrangement, no matter what the engine speed, altitude, barometric pressure or temperature may be and no matter how much leakage there may be through the diaphragm, a substantially constant low evaporator pressure and temperature is maintained through the opening of the suction line valve upon any slight excess pressure or any corresponding rise in temperature.

Further objects and advantages of the present invention will be apparent from the following description, reference being had to the accompanying drawings wherein a preferred embodiment of the present invention is clearly shown.

Figure 1:
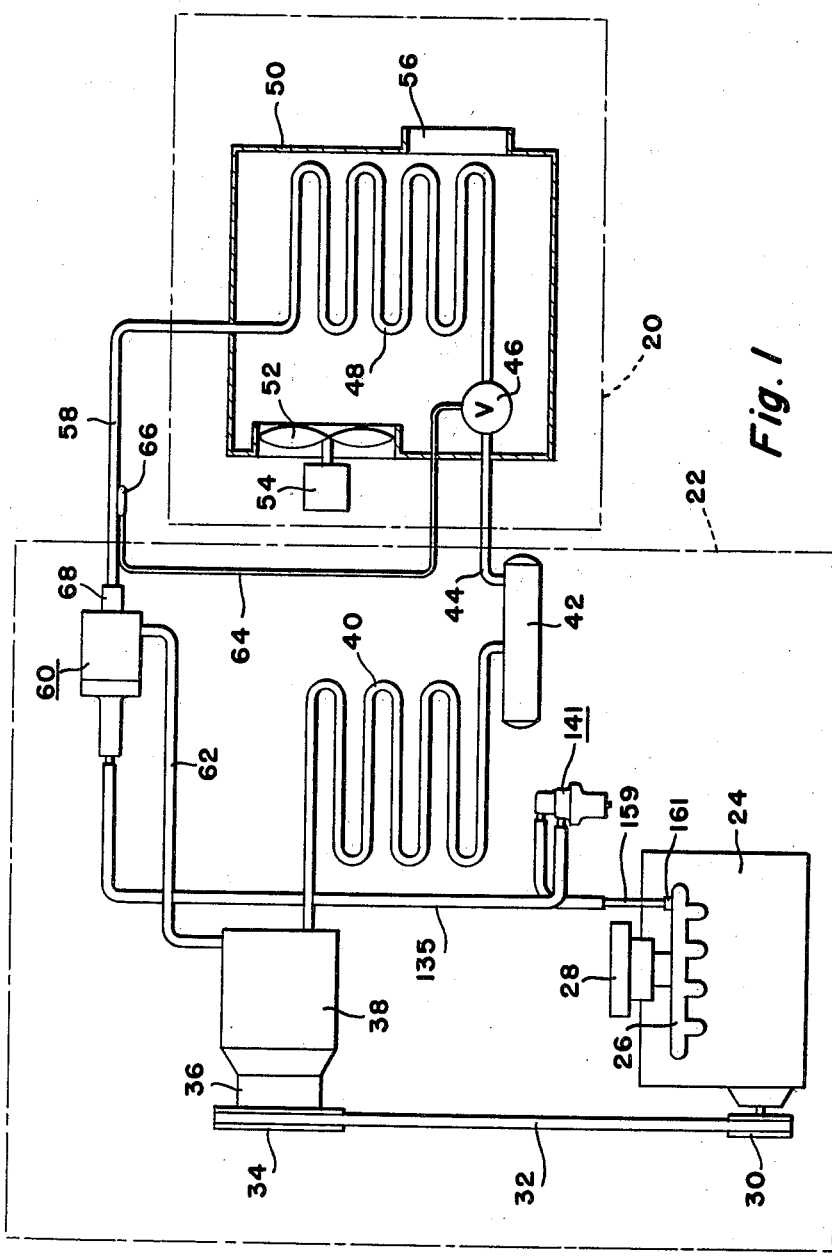
FIGURE 1 is a diagrammatic view of an automobile air conditioning system embodying one form of my invention.
Figure 3:
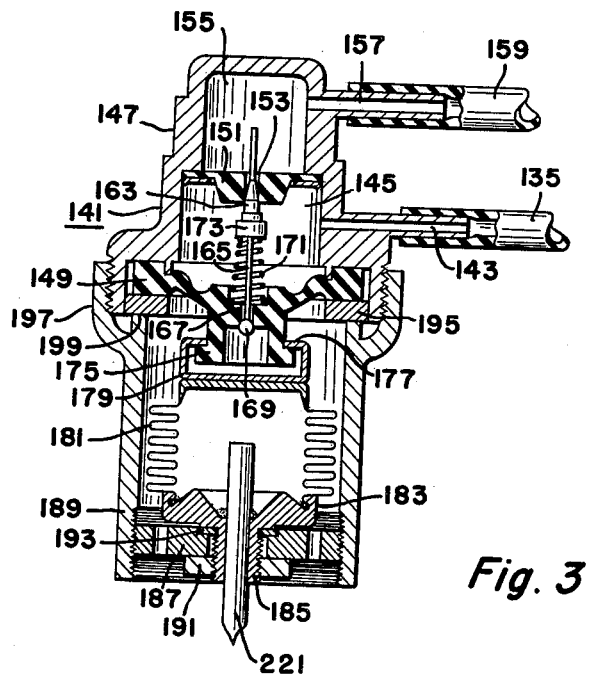
FIGURE 3 is a sectional view through the vacuum regulating valve shown in FIGURE 1.

Referring now more particularly to FIGURE 1, there is shown diagrammatically an automobile provided with a passenger space 20 illustrated by dot and dash line enclosure and an engine compartment 22, likewise designated by a dot and dash line enclosure. In the engine compartment 22, there is illustrated an internal combustion engine 24 used for driving the automobile and provided with intake manifold 26, normally maintained during operation at a varying vacuum or low absolute pressure. A conventional carburetor 28 is connected for supplying the fuel mixture to the intake manifold 26. The engine 24 has a drive pulley 30 at the front which through a belt 32 drives a pulley 34 connecting through a clutch 36 with the automotive air conditioning compressor 38.

The compressor 38 delivers compressed refrigerant to the condenser 40 which is located in front of the conventional automotive radiator. The refrigerant condensing within the condenser 40 drains into the receiver 42 from which the liquid refrigerant flows through a supply conduit 44 through a thermostatic, automatic expansion valve 46 to the inlet of the evaporator 48 located within an evaporator chamber 50 within the passenger compartment 20. A fan 52 driven by the electric motor 54 normally draws air from the interior of the passenger compartment 20 and circulates the air through the evaporator compartment 50 containing the evaporator 48 and discharges the cooled air through the discharge opening 56 back into the passenger space so as to keep the passenger space cool. The liquid refrigerant evaporates at a reduced constant pressure within the evaporator 48 which is sufficiently low to obtain maximum cooling without frosting of this evaporator. The evaporated refrigerant which evaporates within the evaporator 48 is delivered through the first portion of a suction conduit 58 to the inlet 68 of the evaporator pressure regulating valve 60 having its outlet 70 connecting through the second portion 62 of the suction conduit to the inlet of the compressor 38. The thermostatic chamber of the thermostatic expansion valve 46 is connected by a capillary tube 64 to the thermostat bulb 66 mounted in heat transfer relation with the suction conduit 58 so as to maintain the evaporator 48 substantially filled with liquid refrigerant at all times so as to assure the maximum efficiency obtainable for the evaporator 48.

Figure 2:
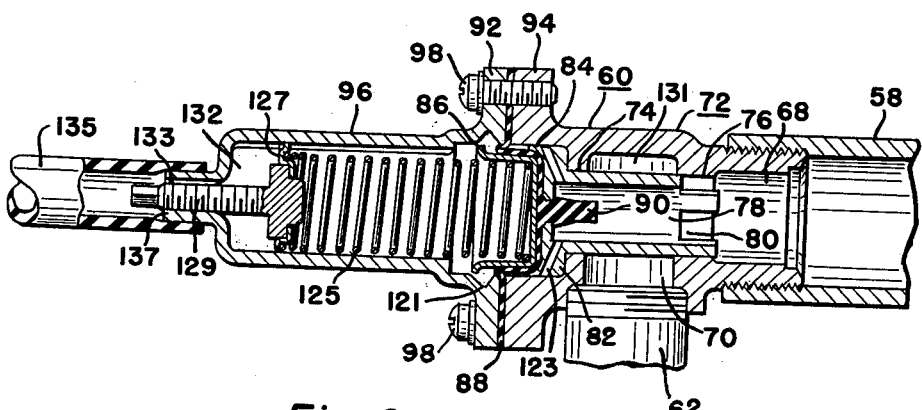
FIGURE 2 is a sectional view through the suction line regulating valve shown in FIGURE 1.

The evaporator regulating valve 60 includes an inlet 68 connecting to the first section 58 of the suction conduit and an outlet 70 connecting to the second section 62 of the suction conduit. The valve body 72 is provided with two aligned openings 74 and 76 which guide the piston valve 78 which is aligned with the inlet 68. The piston valve 78 is provided with an enlarged head 82 located in an enlarged recess 84 in the adjacent portion of the valve body 72. Between the cup-shaped spring retainer 86 and the enlarged head 84 of the piston 78, there is provided the central cup-shaped portion of the rolling fold type of elastomeric diaphragm 88. The central portion of this diaphragm 88 has a projection 90 retained in and firmly held within a concentric aperture in the center of the enlarged portion 82 of the piston valve 78. The skirt or peripheral portion of the elastomeric diaphragm 88 is held by the flanges 92 and 94 of the spring casing 96 and the valve body 74 through which are threaded the clamping screws 98. The flange portion 92 is provided with an annular recess 121 surrounding the spring retainer 86 into which the rolling fold formed between the cup-shaped portion and the radial portion of the diaphragm 88 extends as the piston valve 78 and the cup-shaped portion move to the left as shown in FIGURE 2.

A passage extends from the hollow center of the piston valve 78 to the space between its enlarged head 82 and the elastomeric diaphragm 88 so as to apply the pressure within the first section 58 of the suction conduit to the inner face of the diaphragm 88. As the pressure increases slightly within the evaporator 48 and the first section 58, the pressure moves the piston valve 78 and the diaphragm 88 to the left and expands the folded portion of the diaphragm 88 into the annular recess 121 as the valve begins to uncover the notches 80 to provide an increased diaphragm working area so as to reduce the rate of the valve. That is, the valve will open a greater amount upon a very small increase in pressure above the minimum of pressure, such as 44½ pounds per square inch absolute. This opening movement is opposed by a very low-rate spring 125 located within the spring casing 96. This spring 125 bears at one end upon the cup-shaped spring retainer 86 and bears at the opposite end against a spring retainer 127 which is keyed to the sidewall of the casing 96 to prevent its rotation. The position of the spring retainer 127 is adjusted by the adjusting screw 129 so as to obtain the adjustment for maintaining the exact desired absolute pressure, such as 44½ pounds, within the evaporator 48. The valve body 72 has a discharge chamber 131 surrounding the piston valve 78 between the seats 74 and 76 connecting directly with its outlet 70 and the second section 62.

If the spring casing 96 were sealed, there would be a likelihood that the valve 60 eventually would become inoperative, since the elastomeric diaphragm 88 tends to leak refrigerant at a relatively slow rate, for example, about one pound per year. Also, temperature would cause a rise or fall in pressure within the spring casing 96 due to thermal expansion. This would also affect the setting of the valve 60. If the diaphragm 88 on the side where the spring 125 is located were made freely open to the atmosphere, the changes in barometric or atmospheric pressure would affect the setting of the valve 60. This change in barometric pressure amounts to about one-half pound for each thousand feet change in altitude. The changes in the barometric pressure due to changes in weather are much smaller.

According to our invention, we maintain a substantially constant vacuum of about six inches of mercury within the chamber 132 containing the spring 125. This is accomplished by cutting a passage 133 through the threads supporting the screw 129. The flexible tube 135 fits over the neck portion 137 of the casing 96 surrounding the screw 129. The tube 135 connects to the inlet connection 143 communicating with the absolute pressure chamber 145 in the valve 141. The valve 141 includes a valve body 147 provided with an elastomeric diaphragm 149 on the bottom side of a chamber 145 and a wall and valve seat 151 containing a valve opening 153 which separates the chamber 145 from the upper chamber 155 connecting with the outlet connection 157. The outlet connection 157 connects through the flexible tube 159 with the connector 161 connecting to the interior of the intake manifold 26 of the automobile engine 24. A proportioned needle valve 163 extends through the valve opening 153 and controls the flow of air from the connection 143 to the connection 157. The needle valve 163 is connected to the upper end of a valve stem 165 extending downwardly through a centrally located aperture 167 in the diaphragm 149 and is provided with a ball-shaped valve element 169 at the opposite end of the aperture. A compression spring 171 extends between the diaphragm 149 and the central enlargement which forms the spring retainer 173 on the needle valve 163. This spring 171 normally holds the valve element 169 in a position closing the aperture 167 and holds the valve needle 163 away from the diaphragm 149. The bottom side of the diaphragm 149 is provided with a downwardly extending neck and collar or flange 175 which is clamped by the projections 177 of the yoke 179 which are fastened to the closed upper end of the sealed bellows 181.

The lower end of the bellows 181 is sealed to a fitting 183 which is provided with a neck portion 185 rotatably mounted in the thin nut 187. A nylon washer 193 is provided between the fitting 183 and the nut 187. A nut 191 is threaded onto the neck 185 and is not screwed tight but is locked so as to allow the nut 187 to rotate upon the neck 185. The nut 187 is threaded into the interior of the bellows casing 189 so as to adjust the tension upon the bellows and to adjust the regulated vacuum absolute pressure provided in the chamber 145 by the valve 141. The bellows casing 189 has a flange 197 which is threaded onto the outer periphery of the valve body 147. The casing 189 also has an internal flange 199 which bears upon the metal ring 195 which in turn presses against the flange of the diaphragm 149 so as to seal the diaphragm 149 to the adjacent shoulders of the valve body 147. The bellows 181 is preferably evacuated to the maximum vacuum obtainable by commercial vacuum producing machinery, such as, for example, 29 inches. This bellows 181 compensates for the effect of atmospheric or barometric pressure upon the diaphragm 149 by providing an equal and opposite reaction thereto. The nut 187 is adjusted to maintain a tension upon the bellows 181 sufficient to maintain a vacuum of about six inches in the chamber 145 of the valve body 147.

If a vacuum is drawn by the intake manifold 26 which is greater than six inches, the needle valve 163 will close and, if necessary, the diaphragm 149 will move upwardly a sufficient amount to open the passage 167 minutely to prevent the vacuum from becoming greater than six inches. This sensitive valve 141 will therefore maintain a substantially constant absolute pressure within the chamber 132 of the spring casing 96 unaffected by temperature and altitude variations and unaffected by any leakage of the diaphragm 88. This substantially constant vacuum in the chamber 132 along with the characteristics of low rate of the diaphragm 88 and the spring 125 assure that the temperature and pressure of the refrigerant in the evaporator 48 will be maintained substantially constant at all times under all expected conditions of operation. Since the bellows 181 is highly evacuated, the pressure within it will be substantially unaffected by variations in temperature.

While the embodiment of the present invention, as herein disclosed, constitutes a preferred form, it is to be understood that other forms might be adopted.

What is claimed is as follows:

1. An automobile air conditioning system including a refrigerant compressor and condenser and flow control device and an evaporator connected in an operative refrigerant circuit containing a suction conduit connecting the evaporator and the compressor, an internal combustion engine provided with an intake manifold having a variable absolute pressure, said engine having means for driving the automobile and the compressor, a suction line evaporator pressure regulating valve connected in said suction conduit containing an operating diaphragm having one side exposed to the refrigerant in said suction conduit for keeping the evaporator at substantially constant temperature regardless of the refrigerating conditions, said valve including a casing enclosing and forming a chamber upon the opposite side of said operating diaphragm, said valve having a tendency to slight leakage into said chamber, and means for maintaining a substantially constant absolute pressure in said chamber within said casing regardless of changes in temperature and atmospheric pressure comprising conduit means connecting with the interior of said casing provided with a second constant pressure regulating valve connecting the interior of said casing and said intake manifold.

2. An automobile air conditioning system including a refrigerant compressor and condenser and flow control device and an evaporator connected in an operative refrigerant circuit containing a suction conduit connecting the evaporator and the compressor, an internal combustion engine provided with an intake manifold having a variable absolute pressure, said engine having means for driving the automobile and the compressor, a suction line evaporator pressure regulating valve connected in said suction conduit containing an operating diaphragm having one side exposed to the refrigerant in said suction conduit for keeping the evaporator at substantially constant temperature regardless of the refrigerating conditions, said valve including a casing enclosing and forming a chamber upon the opposite side of said operating diaphragm, said valve having a tendency to slight leakage into said chamber, means for maintaining a substantially constant absolute pressure in said chamber within said casing regardless of changes in temperature and atmospheric pressure comprising conduit means connecting with the interior of said casing provided with a second constant pressure regulating valve connecting the interior of said casing and said intake manifold, said second regulating valve including atmospheric pressure compensating means for preventing changes in atmospheric pressure from affecting the constant pressure maintained.

3. An automobile air conditioning system including a refrigerant compressor and condenser and flow control device and an evaporator connected in an operative refrigerant circuit containing a suction conduit connecting the evaporator and the compressor, an internal combustion engine provided with an intake manifold having a variable absolute pressure, said engine having means for driving the automobile and the compressor, a suction line evaporator pressure regulating valve connected in said suction conduit containing a first low rate operating diaphragm having one side exposed to the refrigerant in said suction conduit for keeping the evaporator at substantially constant pressure and temperature regardless of refrigerating conditions or changes in temperature or atmospheric pressure, said valve including a casing enclosing and forming a chamber on the opposite side of said first diaphragm, means for maintaining within normal operating conditions a substantially constant absolute pressure in said chamber within said casing regardless of changes in the operation of the engine or variations in temperature or barometric pressure comprising conduit means connecting with the interior of said casing provided with a second constant pressure regulating valve connecting the interior of said casing with said intake manifold, said second valve having a first valve seat provided with a first valve opening, a second flexible diaphragm adjacent the valve seat exposed on one side to the pressure within said chamber and to the opposite side to atmospheric pressure and being provided with a second valve opening and a second valve seat, a valve member cooperating with said first and second valve seats to control said first and second valve openings, and resilient means for urging said valve member away from said second diaphragm toward said first valve seat.

4. An automobile air conditioning system including a refrigerant compressor and condenser and flow control device and an evaporator connected in an operative refrigerant circuit containing a suction conduit connecting the evaporator and the compressor, an internal combustion engine provided with an intake manifold having a variable absolute pressure, said engine having means for driving the automobile and the compressor, a suction line evaporator pressure regulating valve connected in said suction conduit containing a first low rate operating diaphragm having one side exposed to the refrigerant in said suction conduit for keeping the evaporator at substantially constant pressure and temperature regardless of refrigerating conditions or changes in temperature or atmospheric pressure, said valve including a casing enclosing and forming a chamber on the opposite side of said first diaphragm, means for maintaining within normal operating conditions a substantially constant absolute pressure in said chamber within said casing regardless of changes in the operation of the engine or variations in temperature or barometric pressure comprising conduit means connecting with the interior of said casing provided with a second constant pressure regulating valve connecting the interior of said casing with said intake manifold, said second valve having a first valve seat provided with a first valve opening, a second flexible diaphragm adjacent the valve seat exposed on one side to the pressure within said chamber and to the opposite side to atmospheric pressure and being provided with a second valve opening and a second valve seat, a valve member cooperating with said first and second valve seats to control said first and second valve openings, resilient means for urging said valve member away from said second diaphragm toward said first valve seat, and means for compensating for the effect of changes in atmospheric pressure upon said second diaphragm.

References Cited in the file of this patent
UNITED STATES PATENTS

| | | |
|---|---|---|
| 2,766,593 | Mitchell | Oct. 16, 1956 |
| 2,966,044 | Mitchell | Dec. 27, 1960 |